United States Patent

[11] 3,607,284

[72] Inventor Donald M. Harvey
Rochester, N.Y.
[21] Appl. No. 695,768
[22] Filed Jan. 4, 1968
[45] Patented Sept. 21, 1971
[73] Assignee Eastman Kodak Company
Rochester, N.Y.

[54] RIGID FRAME SENSITIVE UNIT SUITABLE FOR EXPOSURE AND PROCESSING IN AN EXPOSING DEVICE
12 Claims, 4 Drawing Figs.

[52] U.S. Cl. ........ 96/76, 96/3, 96/29 D
[51] Int. Cl. ........ G03c 5/54
[50] Field of Search ........ 96/29 D, 3, 76

[56] References Cited

UNITED STATES PATENTS

| | | | |
|---|---|---|---|
| 3,053,659 | 9/1962 | Land | 96/76 |
| 3,298,832 | 1/1967 | Ryan | 96/76 |
| 3,201,248 | 8/1965 | Erikson | 96/76 |
| 3,390,991 | 7/1968 | Cook | 96/76 |

*Primary Examiner*—Norman G. Torchin
*Assistant Examiner*—John L. Goodrow
*Attorneys*—Robert W. Hampton and Gary D. Fields

ABSTRACT: A radiation-sensitive unit such as a slide transparency unit is provided with at least one rupturable pod formed adjacent to an edge of a rectangular supporting member having a central opening across which a radiation-sensitive element extends. The unit preferably is provided with two pods which are adapted to be ruptured sequentially by a first-and-second-piston mechanism within an exposing device in such a manner that processing agents contained in the pods are ejected sequentially into a space between the radiation-sensitive element and a strippable sheet so that development and fixing of the image can take place. The strippable sheet, at least a portion of the pods, and any unabsorbed processing agents are stripped from the unit after the unit has been processed and removed from the camera so that the unit will be ready for use.

DONALD M. HARVEY
INVENTOR.

BY Gary D. Fields
Robert W Hampton

ATTORNEYS

RIGID FRAME SENSITIVE UNIT SUITABLE FOR EXPOSURE AND PROCESSING IN AN EXPOSING DEVICE

CROSS REFERENCE TO RELATED APPLICATION

A radiation-sensitive unit according to this invention could be utilized in the camera disclosed in my copending, commonly assigned U.S. Pat. Application Ser. No. 695,769, filed on even date herewith.

BACKGROUND OF THE INVENTION

1. Field of the Invention

This invention relates generally to a radiation-sensitive unit suitable for exposure and processing in an exposing device, and particularly to a slide transparency unit that is adapted to be exposed and processed within a camera and then viewed by transmitting light through the transparency and projecting an image thereon onto a suitable surface.

2. Description of the Prior Art

A single-pod system is disclosed by Friedman et al. in U.S. Pat. No. 3,309,201, which is directed to a transparency unit for effecting a diffusion transfer utilizing an image-receiving surface and a separate photosensitive surface. In addition, the structure there described includes a leader that is attached to each unit and is adapted to extend through a development chamber in the camera and through an exit slot in the camera housing so that it can be pulled to effect processing of the transparency unit after exposure.

SUMMARY OF THE INVENTION

In Accordance with this invention there is provided a radiation-sensitive unit that is suitable for exposure and processing in an exposing device. The unit comprises a radiation-sensitive element and a plurality of superposed members supporting the element, one of the members being removable from the element. Opposing surfaces of the removable member and another of the members jointly define a rupturable pod that is communicatable with the element. The pod is adapted to contain a processing agent that is exudable from the pod onto the element, when the pod is ruptured, for processing the element after the element has been exposed. The superposed members may or may not be substantially coextensive. Either way, two of the members may be removable, in which case opposing surfaces of the removable members may jointly define the pod.

In the two illustrated embodiments of this invention, the radiation-sensitive unit is a slide transparency unit adapted to be exposed and processed in a photographic camera. Each transparency unit has two pods formed jointly by contiguous end portions of a pair of superposed transparency-supporting members having aligned central openings across which a slide transparency extends. Such units are particularly adapted for use with a camera having pod-rupturing means for sequentially rupturing a pair of pods and spreading the processing agents contained therein across the transparency. In the preferred embodiment, the pods are formed jointly by a marginal end portion of a transparency-supporting mount and a strippable cover sheet overlying the mount. In an alternative embodiment, the pods are formed jointly by marginal end portions of two sheets which are strippable from the transparency-supporting mount.

It will be understood that the term "transparency," as used herein, refers to the film exposure area, either in its unexposed, exposed processed condition.

Additional novel features of this invention will become apparent in the description presented below in conjunction with the accompanying drawing.

DESCRIPTION OF THE ILLUSTRATED EMBODIMENTS

The Preferred Embodiment

Figure 1:
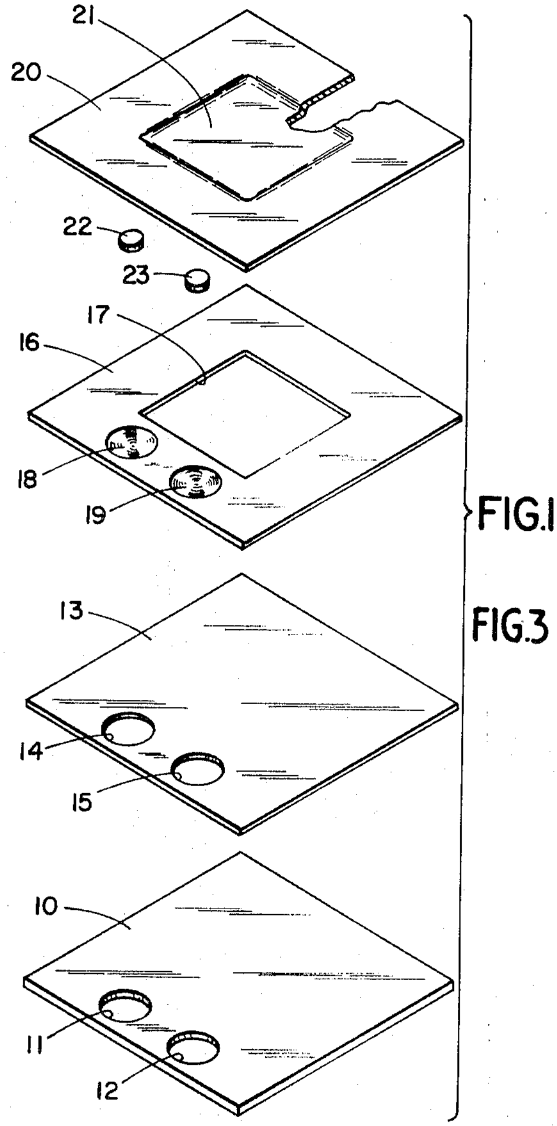
FIG. 1 is an exploded view of the preferred embodiment of this invention, with certain parts broken away for clarity of illustration.

In accordance with the preferred embodiment of this invention, shown in FIGS. 1 and 2, a slide-transparency unit T includes a base 10 having a pair of openings 11 and 12 adjacent to one edge thereof to accommodate a pair of rupturable pods, or pod members, as discussed below. Conveniently, the base is transparent so that exposure can be made therethrough. A film emulsion or transparency 13 is placed above base 10 and has a pair of openings 14 and 15 corresponding in size and location to openings 11 and 12 in base 10. Above the transparency 13 is a mount 16, which may be of relatively thick construction, that has a central opening 17 which defines the viewing area of the transparency. Mount 16 also includes, in a marginal end portion thereof, a pair of hollow pods or pod members 18 and 19 that are adapted to be received within holes 14 and 15 of transparency 13 and holes 11 and 12 of base 10. A strippable cover sheet 20, provided over mount 16, has a central depressed area 21 which extends through opening 17 of mount 16 and is in virtual contact with the exposure area of transparency 13 prior to development of transparency 13. Also, cover sheet 20 extends across pod members 18 and 19 to form a top therefore.

To effect processing of transparency 13, pods 18 and 19 are sequentially ruptured so that nonviscous processing agents contained therein will be sequentially forced between transparency 13 and depressed portion 21 of cover sheet 20 into a space thus formed by forcing the depressed portion away from the transparency. Each of the nonviscous processing agents may be held under pressure so as to cover the entire viewing area of the transparency, as disclosed in commonly assigned U.S. Pat. No. 3,352,674, entitled "Process and Product for Image Transfer Photography" and issued on Nov. 14, 1967. After an appropriate development period following the rupturing of the first pod, e.g., pod 18, and the spreading of a developing agent therein as just described, any excess of such developing agent remaining between portion 21 and transparency 13 may be forced back into pod 18, as disclosed in the above identified patent or in copending U.S. Pat. application Ser. No. 695,769, and then absorbed by sponge 22 seated in pod 18. The second pod, e.g., pod 19, is then ruptured, and the processing agent therein, such as a fixing fluid, is forced between transparency 13 and depressed portion 21. Any excess of such processing agent or fixing agent fluid can then be forced back into pod 19 and absorbed by sponge 23 therein in the same manner as was the developing agent in pod 18. After the transparency unit T is removed from the camera, cover sheet 20 can be stripped from the unit as illustrated in FIG. 2, thereby leaving a finished transparency unit ready for viewing.

Figure 2:
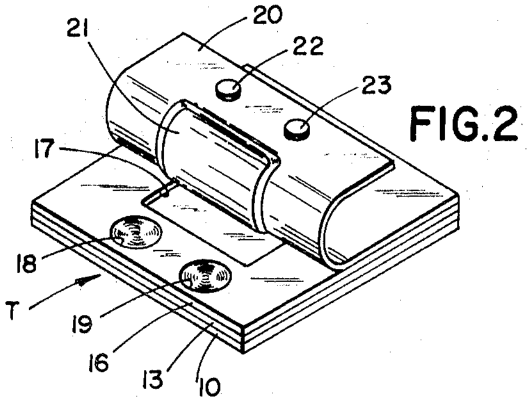
FIG. 2 is a perspective view of the transparency unit of FIG. 1 in assembled condition but with the cover sheet being stripped away.

Thus, the preferred embodiment of FIGS. 1 and 2 illustrates a radiation-sensitive unit, in the form of slide-transparency unit T, which comprises a radiation-sensitive element, in the form of transparency 13, and a plurality of superposed members supporting the element, in the form of base 10, mount 16, and sheet 20, one of such members, sheet 20, being removable from the element. In this embodiment, opposing surfaces of the removable member, sheet 20, and another of the members, mount 16, jointly define a pair of rupturable pods that are communicatable with the element, transparency 13, each pod being adapted to contain a processing agent exudable from the pod onto the element, when the pod is ruptured, for processing the element after the element has been exposed. As may be noted, the superposed members 10, 16, and 20 in this embodiment are substantially coextensive.

An Alternative Embodiment

Figure 3:
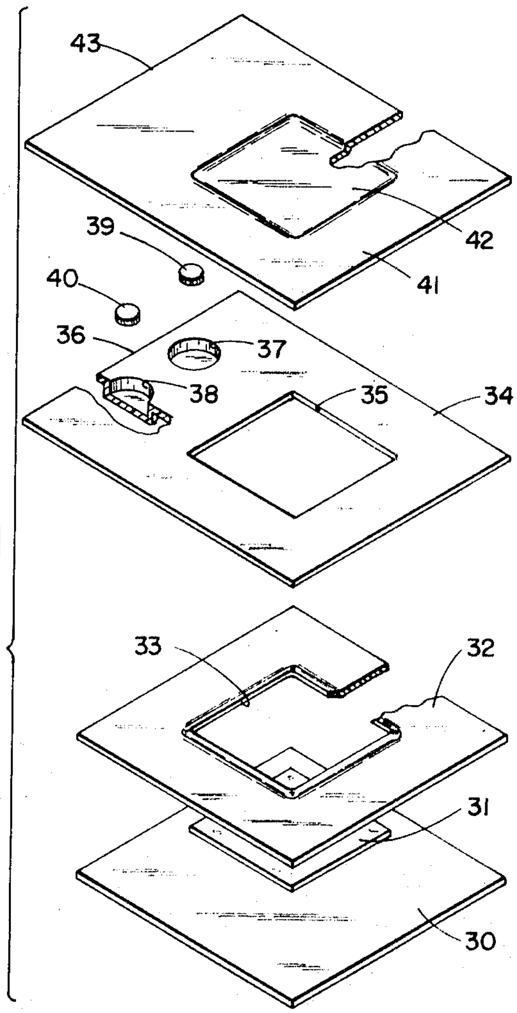
FIG. 3 is an exploded view, similar to FIG. 1, of an alternative embodiment of this invention, showing an alternative transparency-unit construction.
Figure 4:
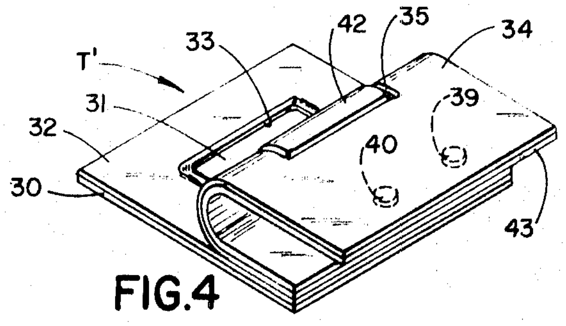
FIG. 4 is a perspective view of the transparency unit of FIG. 3 in assembled condition but with the cover sheet and pod sheet being stripped away.

In accordance with an alternative embodiment of this invention shown in FIGS. 3 and 4, a slide-transparency unit T′ includes a transparent base 30 on which is mounted a substantially smaller transparency 31. A mount 32, which may be attached adhesively to base 30, has a central opening 33 which defines the viewing area of transparency 31. Overlying mount 32 is a pod sheet 34 having an opening 35 which corresponds with opening 33 in mount 32. Pod sheet 34 includes an end portion 36 which extends beyond one end of mount 32 and has a pair of depressions or pod members 37 and 38 formed therein to contain processing agents. Conveniently, a pair of absorbent elements, such as sponges 39 and 40, are provided in depressions 37 and 38, respectively for absorbing any excess processing agents after transparency 31 has been processed. Overlying pod sheet 34 is a cover sheet 41 having a central depressed area 42 which extends through opening 35 in pod sheet 34 and through opening 33 in mount 32 and virtually contacts the viewing area of transparency 31 prior to development of transparency 31. An outwardly extending end 43 of cover sheet 41 extends over depressions 37 and 38, forming a top for such depressions and thereby completing the corresponding pods. Sequential application of pressure upon the pods causes them to be sequentially ruptured, as in the previously described embodiment, so that the processing agents therein will be sequentially forced between transparency 31 and depressed portion 42 of cover sheet 41 into a space thus formed by forcing the depressed portion away from the transparency. After the processing has been completed, and the unit removed from the camera, cover sheet 41 and pod sheet 34 are stripped from the mount 32 as shown in FIG. 4. In this embodiment, the pods are completely removed from the unit and discarded of rather than being partially left on a marginal end portion as in the previously described embodiment.

Thus, the alternative embodiment of FIGS. 3 and 4 illustrates a radiation-sensitive unit, in the form of slide transparency unit T′, which comprises a radiation-sensitive element, in the form of transparency 31, and a plurality of superposed members supporting the element, in the form of base 30, mount 32, sheet 34, and sheet 41, two of such members, sheets 34 and 41, being removable from the element. In this embodiment, opposing surfaces of two removable members, sheets 34 and 41, jointly define a pair of rupturable pods that are communicatable with the element, transparency 31, each pod being adapted to contain a processing agent exudable from the pod onto the element, when the pod is ruptured, for processing the element after the element has been exposed. As may be noted, the superposed members 30, 32, 34 and 41 in this embodiment are not coextensive.

From the foregoing, it can be seen that the novel features of this invention are significant. In the illustrated embodiments, a radiation-sensitive unit such as a slide-transparency unit has been provided that requires no leader for its operation but which includes a cover sheet covering a pair of pods that can be formed partially in the mount, as in the preferred embodiment, or formed separately therefrom, as in the alternative embodiment. In both embodiments the pods are adapted to be sequentially ruptured so that the processing agents therein will be sequentially forced between the cover sheet and the radiation-sensitive element to effect the desired processing of the element. After the processing has been completed and the unit removed from the exposing device the cover sheet is removed thereby either leaving at least part of the pods in a marginal end portion of the mount, as in the preferred embodiment, or removing the pods with the cover sheet, as in the alternative embodiment.

The invention has been described in detail with particular reference to preferred and alternative embodiments thereof, but it will be understood that variations and modifications can be effected within the spirit and scope of The invention.

I claim:

1. A slide-transparency unit suitable for exposure and processing by a camera, said unit comprising:
a substantially rigid mount having a central opening therein;
a transparency supported by said mount and lying across said opening, said transparency being viewable, after it has been exposed and processed, by transmitting light therethrough;
a strippable cover sheet supported by said mount, said cover sheet lying across said opening for defining a space between said transparency and said sheet; and
means defining a depression in said mount adjacent to said opening, said cover sheet including a flexible portion lying across said depression to define therewith a rupturable pod for containing a processing agent to be exuded from said pod, when ruptured, into said space to process said transparency after it has been exposed.

2. A slide-transparency unit suitable for exposure and processing within a camera, said unit comprising:
a mount having a central opening therein:
a transparency supported by said mount and lying across said opening, said transparency being viewable, after it has been exposed and processed, by transmitting light therethrough;
a strippable cover sheet supported by said mount, said cover sheet lying across said opening to define a space between said transparency and said sheet; and
a pair of spaced rupturable pods supported by said mount, located substantially the same distance from said opening, for containing processing agents to be exuded from said pods, when ruptured, into said space to process said transparency after it has been exposed.

3. A slide-transparency unit as claimed in claim 2 wherein:
both of said pods are located adjacent to said opening so that said processing agents can be exuded from said pods, when ruptured, in substantially the same direction toward said space.

4. A slide-transparency unit as claimed in claim 2 further including:
a transparent base supported by said transparency so that said transparency can be exposed to light transmitted through said base.

5. A slide-transparency unit as claimed in claim 2 wherein:
said pods are partially defined by means defining a pair of spaced depressions in said mount adjacent to said opening.

6. A slide-transparency unit as claimed in claim 2 further including:
a transparent base supported by said transparency, so that said transparency can be exposed to light transmitted through said base, said base having a central portion thereof opposite said central opening and a first pair of spaced openings adjacent to said central portion; and
means defining a second pair of spaced openings in said transparency in alignment with said first pair of spaced openings in said base;
and wherein said pair of spaced pods supported by said mount are in alignment with, and receivable in, said first and second pairs of spaced openings.

7. A slide-transparency unit as claimed in claim 2 wherein:
said pods are defined by depressions in said mount and corresponding portions of said cover sheet lying across said depressions.

8. A slide-transparency unit as claimed in claim 2 further including:
a pod sheet between said mount and said cover sheet, said pod sheet having a central opening therein in alignment with said central opening in said mount and an end portion thereof defining a pair of depressions covered by said cover sheet to form said pods.

9. A slide-transparency unit as claimed in claim 8 wherein:
   said end portion of said pod sheet extends beyond an end of said mount.

10. A slide-transparency unit as claimed in claim 8 further including:
   absorbent means in said pods for absorbing excess processing agents after said transparency has been processed.

11. A radiation-sensitive unit suitable for exposure and processing by an exposing device, said unit comprising a radiation-sensitive element and a rigid frame supporting said element said rigid frame including means defining a void, and a flexible element coupled to said frame and overlying he void to jointly define with the void a rupturable container coupled with said element, said container being adapted to contain a processing agent exudable from said container onto said element, when said container is ruptured, for processing said element after said element has been exposed.

12. A radiation-sensitive unit as claimed in claim 11 wherein said flexible element is removable from said means defining said void and from said frame.